(12) United States Patent
Ihde

(10) Patent No.: US 10,907,627 B2
(45) Date of Patent: Feb. 2, 2021

(54) SYSTEMS AND METHODS FOR RUNNING AN AIR COMPRESSOR USING A PERMANENT MAGNET GENERATOR

(71) Applicant: Illinois Tool Works Inc., Glenview, IL (US)

(72) Inventor: Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 339 days.

(21) Appl. No.: 15/797,851

(22) Filed: Oct. 30, 2017

(65) Prior Publication Data

US 2019/0128253 A1    May 2, 2019

(51) Int. Cl.
| | |
|---|---|
| F04B 49/02 | (2006.01) |
| F04B 17/03 | (2006.01) |
| H02K 7/108 | (2006.01) |
| H02P 9/06 | (2006.01) |
| B23K 9/10 | (2006.01) |
| F02B 63/04 | (2006.01) |
| H02J 7/14 | (2006.01) |
| F04D 27/00 | (2006.01) |
| H02J 7/34 | (2006.01) |
| F01B 25/02 | (2006.01) |
| F01B 17/02 | (2006.01) |
| F01B 23/06 | (2006.01) |

(52) U.S. Cl.
CPC .......... *F04B 49/022* (2013.01); *B23K 9/1006* (2013.01); *F01B 25/02* (2013.01); *F02B 63/04* (2013.01); *F04B 17/03* (2013.01); *F04D 27/001* (2013.01); *H02J 7/1415* (2013.01); *H02J 7/34* (2013.01); *H02K 7/1085* (2013.01); *H02P 9/06* (2013.01); *F01B 17/025* (2013.01); *F01B 23/06* (2013.01)

(58) Field of Classification Search
CPC ...... B23K 9/1006; F01B 17/025; F01B 23/06; F01B 25/02; F02B 63/04; F04B 17/03; F04B 49/022; F04D 27/001; H02P 9/06; H02J 7/1415; H02J 7/34
USPC .................................................. 417/411, 434
See application file for complete search history.

(56) References Cited

U.S. PATENT DOCUMENTS

| | | | |
|---|---|---|---|
| 5,581,168 A | 12/1996 | Rozman et al. | |
| 5,796,190 A | 8/1998 | Takeda et al. | |
| 6,051,809 A | 4/2000 | Colella | |
| 6,459,980 B1 * | 10/2002 | Tabata | B60K 6/46 701/70 |
| 6,534,958 B1 * | 3/2003 | Graber | F02B 63/04 123/2 |
| 7,297,899 B2 | 11/2007 | Fosbinder | |
| 8,200,382 B2 * | 6/2012 | Hahn | B60K 6/48 701/22 |

(Continued)

*Primary Examiner* — Patrick Hamo
*Assistant Examiner* — Joseph S. Herrmann
(74) *Attorney, Agent, or Firm* — McAndrews, Held & Malloy, Ltd.

(57) ABSTRACT

Systems and methods are disclosed of an engine driven power system that includes a permanent magnet generator electrically connected to an energy storage device. An air compressor is coupled to the permanent magnet generator via a clutch. A controller provides power from the energy storage device to the permanent magnet generator to turn the permanent magnet generator to drive the air compressor via the clutch to increase an air pressure level.

17 Claims, 3 Drawing Sheets

(56) References Cited

U.S. PATENT DOCUMENTS

| | | | |
|---|---|---|---|
| 8,604,385 B2* | 12/2013 | Leisner | F04C 18/16 |
| | | | 219/133 |
| 8,759,714 B2* | 6/2014 | Fosbinder | B23K 9/1006 |
| | | | 219/130.21 |
| 9,168,914 B2* | 10/2015 | Martin | B60W 10/06 |
| 9,186,743 B2 | 11/2015 | Radtke et al. | |
| 9,951,681 B2* | 4/2018 | Schnorbus | F02N 11/003 |
| 2003/0094317 A1 | 5/2003 | Takizawa et al. | |
| 2008/0264920 A1 | 10/2008 | Leisner et al. | |
| 2010/0314181 A1 | 12/2010 | Beeson | |
| 2014/0263245 A1 | 9/2014 | Ulrich et al. | |
| 2016/0175968 A1 | 6/2016 | Madsen | |
| 2016/0256950 A1 | 9/2016 | Madsen | |

\* cited by examiner

SYSTEMS AND METHODS FOR RUNNING AN AIR COMPRESSOR USING A PERMANENT MAGNET GENERATOR

BACKGROUND

Conventional welding-type power systems provide power for welding-type tools. Some such systems include a gas-powered engine configured to drive an electric generator. In some cases, the electric generator can generate both welding-type power to provide power to a variety of tools, such as welding-type torches, plasma cutters, etc. In some examples, the engine can drive accessories to the welding system, such as an air compressor. Often, if the engine is turned off or idling, a demand for power from the engine can cause the engine to start or increase speed until fully operational. Activating the engine to provide a full power output may be unnecessary, when power is only needed for a short period of time or to power a small load. Moreover, operating the engine when not necessary can waste fuel and cause unnecessary wear on the gas-powered engine. Thus, a system configured to provide power for limited time or to a limited number and/or type of loads, without fully activating the engine, is therefore desirable.

SUMMARY

Apparatus and methods are disclosed of an engine driven welding-type power system that employs a permanent magnet generator (PMG) to operate an air compressor when the engine is not engaged, substantially as illustrated by and described in connection with at least one of the figures, as set forth more completely in the claims.

In disclosed examples, an engine driven power system includes a permanent magnet generator electrically connected to an energy storage device, an air compressor coupled to the permanent magnet generator via a clutch, and a controller configured to provide power from the energy storage device to the permanent magnet generator to turn the permanent magnet generator to drive the air compressor via the clutch to increase an air pressure level.

In some examples, the system includes a pressure sensor configured to measure the air pressure level and the controller to control the energy storage device to provide power to the permanent magnet generator when the pressure level drops below a threshold low-pressure level. The controller controls the energy storage device to disconnect from the permanent magnet generator when the pressure level exceeds a threshold high-pressure level.

In some examples, the engine is detachably coupled to the permanent magnet generator via a second clutch, the engine configured to drive the permanent magnet generator when coupled to the permanent magnet generator via the second clutch. The controller further configured to monitor a speed of the engine. The controller controls the permanent magnet generator to couple with the engine via the second clutch in response to the engine speed increasing above a threshold level such that the engine drives the permanent magnet generator. The controller controls the permanent magnet generator to decouple from the engine in response to the engine speed decreasing below a threshold level.

In examples, the system includes a converter connecting the permanent magnetic generator to the energy storage device, to condition power from the permanent magnetic generator to provide battery power to recharge the energy storage device when the permanent magnet generator is being driven by the engine via the second clutch. The converter is configured to condition power from the energy storage device to drive the permanent magnetic generator when the permanent magnetic generator is decoupled from the engine.

In some examples, the permanent magnetic generator is configured to generate power for a power output and to drive the air compressor simultaneously.

In another aspect of the disclosure, method of operating an engine driven power system includes monitoring, by a sensor, a pressure level of an air compressor coupled to a permanent magnet generator via a clutch, and connecting, by a controller, an energy storage device to the permanent magnet generator to provide power to turn the permanent magnet generator to drive the air compressor via the clutch in response to the pressure level.

In some examples, the method includes controlling, by the controller, a converter to electrically connect the permanent magnetic generator to the energy storage device. The permanent magnet generator is detachably coupled to the engine, the method further comprising controlling, by the controller, the converter to condition power from the permanent magnetic generator to provide battery voltage power to recharge the energy storage device when the permanent magnet generator is coupled to and being driven by the engine.

The method includes controlling, by the controller, the converter to condition power from the energy storage device to drive the permanent magnetic generator when the permanent magnetic generator is decoupled from the engine.

In some examples, the method includes monitoring, by a sensor, a charge level of the energy storage device, and controlling, by the controller, the converter to condition power from the permanent magnetic generator to recharge the energy storage device in response to the charge level being below a threshold charge level when the permanent magnetic generator is coupled to and being driven by the engine.

In examples, the method includes comparing, at the controller, the pressure level to a plurality of threshold pressure levels, determining, by the controller, whether the pressure level is below a threshold low pressure level or above a threshold high pressure level, and controlling, by the controller, the energy storage device to provide power to turn the permanent magnet generator to drive the air compressor via the clutch in response to the pressure level being below the threshold low-pressure level.

In examples, the method includes controlling, by the controller, the energy storage device to disconnect from the permanent magnet generator in response to the pressure level being above a threshold high-pressure level.

In some examples, the method includes monitoring, at the controller, a power draw at an output connected to the permanent magnet generator, identifying, at the controller, a power demand at the output, and controlling, by the controller, the permanent magnet generator to provide power to the output in response to the identification.

DETAILED DESCRIPTION

Figure 1:
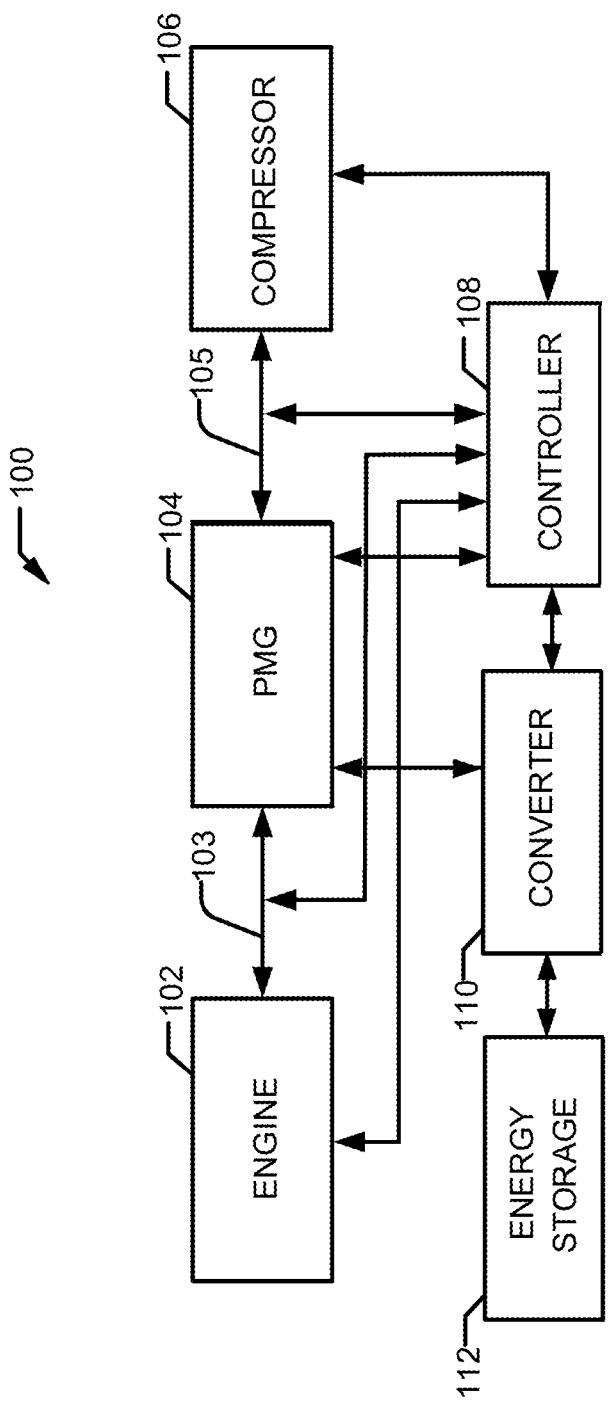
FIG. 1 is a block diagram of an example engine driven power system in accordance with aspects of this disclosure.

Disclosed are examples of an engine driven welding-type power system that employs a permanent magnet generator (PMG) to operate an air compressor when the engine is not engaged. In particular, the PMG is coupled to the air compressor. The PMG can be powered by an energy storage device, which in turn drives the air compressor to increase a pressure to, for example, operate an air-powered tool. With an engine driven welding system using a PMG as the power generation source and an energy storage device connected thereto, it is possible to decouple the PMG from the engine, which can then be used to turn an air compressor to provide compressed air while the engine is off, on standby, etc.

Permanent magnet generators (PMG) are a type of motor, which can be configured to create electric power. Systems that employ PMGs convert mechanical power from the engine into electrical power. PMG systems benefit from a relatively simple construction and small size, which leads to increased mobility and space savings in installation. In a PMG, the excitation field used to create electric power is provided by a permanent magnet instead of a coil, such as in an induction type motor. In particular, when the permanent magnets rotate around conducting wires, electricity is created. Advantageously, the permanent magnets in the PMG are able to run for extended periods of time, as the magnets used in these generators are constructed for long term usage and once installed can work for extended periods of time without needing replacement.

In a PMG system, the rotor and magnetic field rotate at the same speed, as the magnetic field is generated through a shaft mounted permanent magnet and current is induced into a stationary armature. For example, the rotating assembly in the center of the generator (e.g., the rotor) contains the permanent magnet, and the stationary armature (e.g., the stator) is electrically connected to a load.

Engine driven welding systems can be employed to turn an electric generator used to power a variety of welding-type tools (e.g., a welding-type torch, a wire feeder, a plasma torch, etc.), and can be in use for extended periods. Additionally, the engine can be configured to drive an air compressor. As an example, the air compressor can be coupled to the engine to turn the air compressor to generate pressure to operate one or more air-driven tools.

In some examples, the air compressor can be driven by a generator coupled to the engine. Thus, when the engine is driving the generator, the generator will cause the air compressor to rotate. In an engine driven system employing a PMG, application of a current to the PMG can cause the PMG to rotate, even if the engine is decoupled from the PMG or otherwise not driving the PMG (e.g., turned off, idling, etc.). Thus, the engine can be off, yet the air compressor can be in operation, by activating the PMG with power provided by an energy storage device.

Advantageously, PMGs do not require a separate power supply to activate the generator. For example, PMGs do not require a battery to operate, as they do not require additional current for the excitation circuit. Additionally, as PMGs do not use slip rings, the simple design limits maintenance needs in comparison to other motor types (e.g., an induction motor). Further, as the PMGs are typically housed in a sealed container, the generators are suitable for use in harsh environments that contain dust, grit and heat, which are common in a welding work sites.

As described in detail below, engine driven welding systems that employ a PMG as the power generation source can activate the PMG while the engine is idle. In examples, the PMG is configured to be mechanically and/or electrically coupled and decoupled from the engine. The PMG can be decoupled from the engine by use of a clutch such that the PMG could generate energy to power a device (e.g., an air compressor) while the engine is in a standby mode or turned off. Alternatively, the PMG can be directly coupled to the engine and/or the air compressor. In examples, electrical energy to power the PMG is supplied by an energy storage device, which can be integrated with the system, and/or remotely located from the system.

In the example of an air compressor, the PMG can be controlled to connect with and provide power to an air compressor even as the engine is not running and/or not connected to the air compressor. For instance, when decoupled from the engine, the energy generated by the PMG is fed through a controller (e.g., a motor control circuit) to activate an air compressor drive to generate compressed air. Typically, air compressors are used to power air tools and other functions.

Employing a welding-type power system with a PMG to drive an air compressor, as described herein, overcomes the challenges faced in conventional systems. Among the many advantages include a reduction in fuel consumption, noise and emissions; increased engine life with the reduction in engine run time, which will improve engine performance and increase the life expectancy of the engine. Additionally, the PMG activates quickly in response to a demand for the air compressor. Thus, the life of the engine will be increased, and maintenance issues will decrease.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "welding-type system" includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, "energy storage device" is any device that stores energy, such as, for example, a battery, a super capacitor, etc.

As used herein, a "converter" includes a power circuit that receives or provides an ac or dc signal, and converts it to the other of an ac or dc signal, or to a different frequency.

FIG. 1 is a block diagram of an engine driven power system 100. The example power system 100 includes an engine 102 coupled to a permanent magnet generator (PMG) 104 connected to an air compressor 106. A controller 108 is connected to each of the engine 102, the PMG 104, the compressor 106, and an energy storage device 112. In the example of FIG. 1, energy storage device 112 is connected to the PMG via a converter 110, such as a bi-directional converter, to convert energy from the energy storage device 112 to the PMG 104, and/or convert energy from the engine 102, via PMG 104, to the energy storage device 112.

In an example, the controller 108 determines that a pressure level associated with the air compressor 106 has gone below a threshold level, such as based on a sensor signal. One or more threshold pressure levels can be stored on a memory storage device, such as integrated with the controller 108. The threshold pressure levels can be learned (e.g., based on historical data, via machine learning techniques) and/or be set by an operator (e.g., via a user interface). In response, the controller 108 controls the converter 110 to provide power from the energy storage device 112 to the PMG 104. In the current example, the PMG 104 and air compressor 106 are coupled, such that rotation of the PMG 104, initiated in response to the application of power via the energy storage device 112, turns the air compressor 106 to build a pressure level.

Although described as an air compressor, the PMG 104 engine driven system 100 of FIG. 1 (as well as PMG 204 of welding type system 200 of FIG. 2) can be configured to drive a hydraulic pump in a similar manner. Thus, sensors can be configured to sense a pressure level of a fluid of the hydraulic pump, and activate the PMGs 104, 204 as described with respect to the air compressors 106, 206.

In an example, the engine 102, the PMG 104 and the compressor 106 are directly coupled. Alternatively, one or more of the engine 102, the PMG 104 and the compressor 106 are detachably coupled via a clutch 103 or a clutch 105. In this manner, for example, the engine 102 can be decoupled from the PMG 104 which is coupled to the compressor 106, thereby the engine 102 can remain off and/or not driving the PMG 104, while the PMG 104 can drive the compressor 106 (e.g., via power from the energy storage device 112). The controller 108 may be connected to one or both of the clutch 103 or the clutch 15 to selectively control operation of each clutch 103, 105.

The PMG 104 can turn the compressor when the engine 102 is disengaged from the PMG 104 (e.g., when the engine 102 is idling, turned off, out of fuel, etc.). The controller 108 can determine whether the engine 102 is disengaged due to a signal from one or more sensors that monitor operational parameters of the engine 102, such as voltage, current, resistance, temperature, pressure, rotation speed, etc. In an example, the controller 108 of FIG. 1 can be configured as a processor or microcontroller, such as a programmable logic circuit, a system-on-chip, a programmable logic device, and/or any other type of logic circuit.

Activating the PMG 104 to drive the air compressor 106 according to the determined pressure level may be controlled automatically by the controller 108. In an example, the pressure level at the compressor 106 can generates an automatic response by the controller 108, such as to activate the converter 110 to provide power from the energy storage device 112 to the PMG 104 to increase pressure of the air compressor 106, such as in response to a signal indicating a low pressure level. In response to a signal indicating a pressure level above a threshold high-pressure level, the controller 108 deactivates the converter 110 to stop provision of power from the energy storage device 112 to the PMG 104.

Additionally or alternatively, the controller can periodically transmit a test signal to continually monitor the pressure level at the compressor 106 and compare the pressure level to a plurality of threshold pressure levels (e.g., a high and/or a low-pressure level). In a situation where the air compressor 106 requires increased pressure for a relatively short period of time, the engine 102 may remain off while the air compressor 106 is being driven by the PMG 104.

In some examples, the energy storage device 112 is a rechargeable battery pack (e.g., a lithium-ion battery, a nickel-metal hydride battery, etc.). In other examples, the energy storage device 112 is a hybrid battery module, a capacitor, a supercapacitor, or any other type of suitable storage device. The sensor may provide information of the energy storage device 112, such as parameters of a particular type of energy storage device including a charge state (e.g., above/below a threshold charge level), a nominal voltage (e.g., an output voltage when the energy storage device is charged above a threshold level), and/or any other parameter that can be recognized in the signal, such as resistance, current, temperature, for example. Similar to the pressure threshold levels, the one or more threshold charge levels can be stored on a memory storage device, such as integrated with the controller 108. The threshold charge levels can be learned (e.g., based on historical data, via machine learning techniques) and/or be set by an operator (e.g., via a user interface).

If the charge level is below a threshold level, the controller 108 can control the converter 110 to charge the energy storage device 112, such as when PMG 104 is being driven by the engine 102. In a battery recharging operation, by monitoring the signal, the controller 104 can detect an end of a charging operation. In response to detecting the end of the charging operation (i.e., the feedback signal indicates the battery is charged to a threshold level), the controller 104 can command the converter 110 to end provision of power to the energy storage device 112 and/or modify a sub-mode (e.g., change from a normal battery charging sub-mode to a trickle charging sub-mode). Thus, converter 110 is configured to provide power to the energy storage device from the PMG 104 in a recharging mode. In this manner, the system 100 can automatically adjust to a change in the power needs of the energy storage device 112.

Figure 2:
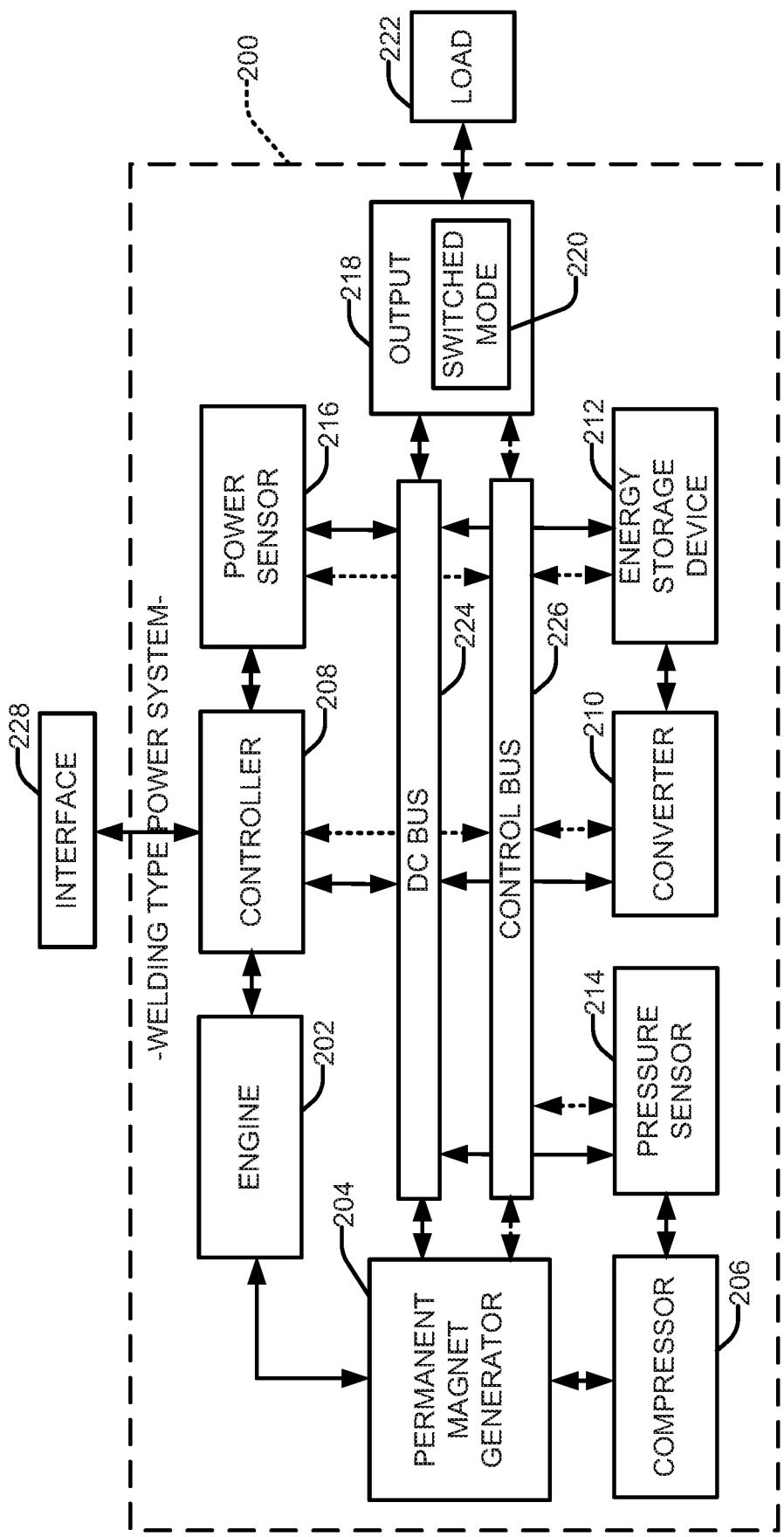
FIG. 2 is a block diagram of an example welding-type power system in accordance with aspects of this disclosure.

FIG. 2 illustrates a block diagram of an example welding-type power system 200. In the system 200, a DC bus 224 is configured to transmit power to and/or from one component to another. In an example, the system 200 would employ the DC bus 224 with a voltage sufficient to power a welding-type tool. In some examples, the DC bus 224 can be converted to make 115 or 220 volts alternating current (VAC) to power auxiliary power components (e.g., a wire feeder), plasma cutters, a battery charger, as well as other systems. The DC bus 224 could connect to a switched mode power supply 220 (e.g., a power inverter) to condition the bus voltage at an output 218. For example, while an engine 202 is driving a permanent magnet generator (PMG) 204, the PMG 204 is generating power for one or more of a controller 208, a converter 210, an energy storage device 212, a pressure sensor 214, a power sensor 216, and the output 218. A control bus 226 is similarly connected and configured to transmit information and commands between components. Thus, when the pressure sensor 214 senses a pressure below a threshold level, the controller 208 can activate the converter 210 to convert power from the energy storage device 212 to power the PMG 204 to turn the compressor 206. In this manner, information and control signals can be transmitted via the common bus, such that individual components do not require additional wiring or dedicated communication lines between components.

In some examples, the sensor(s) 214, 216 are incorporated with the system 200, such as with controller 208. In other examples, sensor(s) 214, 216 are located on one or more components (e.g., engine 202, compressor 206, etc.). Additionally or alternatively, the sensor(s) 214, 216 are located remote from the system 200, and can be configured to monitor one or more operational parameters indirectly (e.g., via temperature, infrared signature, etc.). Based on the monitored parameters, the controller 208 can control the operation of one or more of the engine 202, the PMG 204, the compressor 206, and the energy storage device 212.

Additionally or alternatively, the output 218 can connect to a load 222. Thus, as the PMG 204 generates power, the output 218 can provide output power for a load 222, such as a hand tool. The switched mode power supply 220 can be located at the output 218 or integrated therein to condition power for the load. For instance, a particular load can be identified as requiring a particular level of voltage via one or more sensors (e.g., a low battery charging voltage, a high voltage for a high speed grinder, etc.), and the controller 208 can control the switched mode power supply 220 accordingly. In an example, the output 218 is configured for a particular type of connection (e.g., a welding-type torch cable), while in other examples the power output 218 can be modified to accept multiple types of connectors. In this example, the multi-mode power output 218 may be configured with multiple connection outputs, and/or one or more adapters to accommodate various loads 222 (e.g., a welding-type torch, a rechargeable battery, 120-volt power cord, etc.).

In the example of FIG. 2, the system 200 can include an interface 228 (e.g., a switch, a computer input device, etc.) to provide option for an operator to control a function of the power sources and/or outputs at the system 200. For example, the interface 228 can allow a user to turn off one or more components of the system 200 (e.g., the engine 202), and activate others (e.g., the energy storage device 212, converter 210). In this example, the PMG 204 can be supplied with power from the energy storage device 212 to turn the air compressor 206, while the engine 202 remains off. Additionally or alternatively, the user interface can include a list of operations with either a set of known parameters, or a list of operations that correspond to a learned operation. Thus, the known or historical actions and conditions during a particular operation will aid in the determination of threshold levels, such as a high threshold level corresponding to an upper limit of operating pressure and a low threshold level corresponding to a lower limit of operating pressure level.

Recharging the energy storage device 218 can occur automatically, based on a signal (e.g., from sensors 216) indicating the charge level of the energy storage device 218 has fallen below a threshold level. Further, the controller 206 may command the welding power system 200 to charge energy storage device 218, even when welding is not occurring. Additionally and/or alternatively, a user can initiate recharging of the energy storage device 218 via the interface 228.

Figure 3:
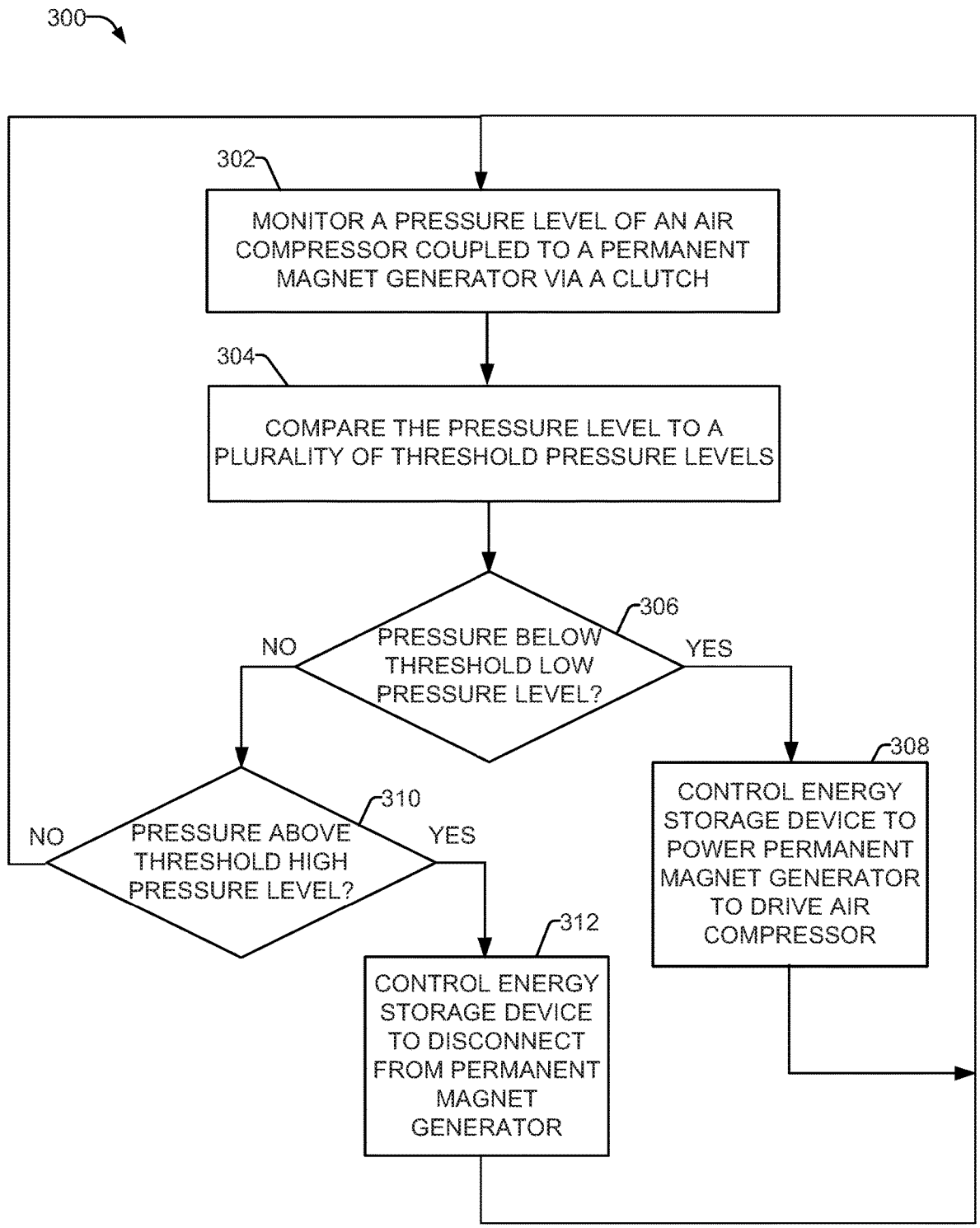
FIG. 3 illustrates an example method of operating an engine driven power system in accordance with aspects of this disclosure.

FIG. 3 is a flowchart illustrating example method 300 of operating an engine driven welding-type power system, for example the systems 100 and 200 of FIGS. 1-2. The method 300 of FIG. 3 may be implemented by the controllers 108 and 208 of FIGS. 1-2 by executing machine-readable instructions, such as stored on a non-transitory machine-readable storage device. At block 302, a sensor (e.g., the sensor 214) monitors a pressure level associated with an air compressor (e.g., the compressor 106, 206). At block 304, the pressure level is compared to a plurality of threshold pressure levels, such as by a controller (e.g., the controllers 108, 208). At block 306, the controller determines whether the pressure level is below a threshold low-pressure level.

If the comparison indicates the pressure is below the threshold low pressure level, at block 308 the controller controls an energy storage device (e.g. the energy storage device 112, 212) to provide power to the permanent magnet generator (e.g., the PMGs 104, 204) via a converter (e.g., the converters 110, 210). The method then continues to block 302 in a loop to continuously monitor the pressure level and/or the system parameters during operation of the system.

If the pressure level at block 306 is not below a threshold low-pressure level, at block 310 the controller determines if the pressure level is above a threshold high-pressure level. If the pressure level is above the threshold high-pressure level, at block 312, the controller controls the energy storage device to disconnect from the PMG (e.g., the converters 110, 210 control disconnect the energy storage device 112, 212 from supplying power). The method then continues to block 302 in a loop to continuously monitor the pressure level and/or the system parameters during operation of the system.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine driven power system, comprising:
a permanent magnet generator electrically connected to an energy storage device;
an air compressor coupled to the permanent magnet generator via a clutch;
a pressure sensor configured to measure an air pressure level; and
a controller configured to:
provide power from the energy storage device to the permanent magnet generator to turn the permanent magnet generator to drive the air compressor via the clutch to increase the air pressure level; and
control the energy storage device to provide power to the permanent magnet generator when the air pressure level drops below a threshold low-pressure level.

2. The engine driven power system as defined in claim 1, the controller to control the energy storage device to disconnect from the permanent magnet generator when the air pressure level exceeds a threshold high-pressure level.

3. The engine driven power system as defined in claim 1, wherein the engine is detachably coupled to the permanent magnet generator via a second clutch, the engine configured to drive the permanent magnet generator when coupled to the permanent magnet generator via the second clutch.

4. The engine driven power system as defined in claim 3, the controller further configured to monitor a speed of the engine.

5. The engine driven power system as defined in claim 4, the controller further configured to control the permanent magnet generator to couple with the engine via the second clutch in response to the engine speed increasing above a threshold level such that the engine drives the permanent magnet generator.

6. The engine driven power system as defined in claim 4, the controller further configured to control the permanent magnet generator to decouple from the engine in response to the engine speed decreasing below a threshold level.

7. The engine driven power system as defined in claim 3, further comprising a converter connecting the permanent magnetic generator to the energy storage device.

8. The engine driven power system as defined in claim 7, wherein the converter is configured to condition power from the permanent magnetic generator to provide battery power to recharge the energy storage device when the permanent magnet generator is being driven by the engine via the second clutch.

9. The engine driven power system as defined in claim 7, wherein the converter is configured to condition power from the energy storage device to drive the permanent magnetic generator when the permanent magnetic generator is decoupled from the engine.

10. The engine driven power system of claim 1, wherein the permanent magnetic generator is configured to generate power for a power output and to drive the air compressor at the same time.

11. An engine driven power system, comprising:
a permanent magnet generator electrically connected to an energy storage device;
an air compressor coupled to the permanent magnet generator via a clutch;
a pressure sensor configured to measure an air pressure level; and
a controller configured to:
provide power from the energy storage device to the permanent magnet generator to turn the permanent magnet generator to drive the air compressor via the clutch to increase the air pressure level; and
control the energy storage device to disconnect from the permanent magnet generator when the air pressure level exceeds a threshold high-pressure level.

12. The engine driven power system as defined in claim 11, the controller to control the energy storage device to provide power to the permanent magnet generator when the air pressure level drops below a threshold low-pressure level.

13. An engine driven power system, comprising:
a permanent magnet generator electrically connected to an energy storage device;
an air compressor coupled to the permanent magnet generator via a clutch;
wherein the engine is detachably coupled to the permanent magnet generator via a second clutch; and
a controller configured to:
monitor a speed of the engine;
provide power from the energy storage device to the permanent magnet generator to turn the permanent magnet generator to drive the air compressor via the clutch to increase an air pressure level; and
control the permanent magnet generator to couple with the engine via the second clutch in response to the engine speed increasing above a threshold level such that the engine drives the permanent magnet generator.

14. The engine driven power system as defined in claim 13, further comprising a pressure sensor configured to measure the air pressure level.

15. The engine driven power system as defined in claim 14, the controller to control the energy storage device to disconnect from the permanent magnet generator when the air pressure level exceeds a threshold high-pressure level.

16. The engine driven power system as defined in claim 13, the controller further configured to control the permanent magnet generator to decouple from the engine in response to the engine speed decreasing below a threshold level.

17. The engine driven power system of claim 13, wherein the permanent magnetic generator is configured to generate power for a power output and to drive the air compressor simultaneously.

* * * * *